United States Patent
Kook

(10) Patent No.: US 8,767,073 B2
(45) Date of Patent: Jul. 1, 2014

(54) DEVICE AND METHOD FOR DISPLAYING INFORMATION FOR VEHICLE

(75) Inventor: Bong-Kwan Kook, Seoul (KR)

(73) Assignee: Mtekvision Co., Ltd., Seoul (KR)

( * ) Notice: Subject to any disclaimer, the term of this patent is extended or adjusted under 35 U.S.C. 154(b) by 840 days.

(21) Appl. No.: 12/980,622

(22) Filed: Dec. 29, 2010

(65) Prior Publication Data

US 2012/0044351 A1 Feb. 23, 2012

(30) Foreign Application Priority Data

Aug. 18, 2010 (KR) .......................... 10-2010-0079601

(51) Int. Cl.
*H04N 7/18* (2006.01)
*B60R 11/04* (2006.01)
*B60K 35/00* (2006.01)

(52) U.S. Cl.
CPC ........... *B60R 11/04* (2013.01); *B60R 2300/802* (2013.01); *B60K 35/00* (2013.01); *B60K 2350/1088* (2013.01)
USPC ....................................................... 348/148

(58) Field of Classification Search
USPC ....................................................... 348/148
See application file for complete search history.

(56) References Cited

U.S. PATENT DOCUMENTS

| 7,689,820 B2 * | 3/2010 | Pierce et al. | 713/2 |
| 2009/0009314 A1 * | 1/2009 | Taniguchi et al. | 340/461 |

\* cited by examiner

*Primary Examiner* — Anner Holder
(74) *Attorney, Agent, or Firm* — Birch, Stewart, Kolasch & Birch, LLP

(57) ABSTRACT

Information display device and method for a vehicle are provided. The information display device for a vehicle includes: a camera unit that generates and outputs image information on the rear side of the vehicle; a main processing unit that performs predetermined functions including an image processing function on the image information; and a sub processing unit that processes the image information and displays the processed image information on a display unit until the main processing unit ends a booting operation, when the image information is output from the camera unit in a state where the main processing unit is performing the booting operation. Accordingly, it is possible to guarantee the safety at the time of backing a vehicle up even when the main processing unit is performing the booting operation and to make a driver not wait until the main processing unit ends the booting operation for the purpose of acquiring necessary information.

19 Claims, 5 Drawing Sheets

DEVICE AND METHOD FOR DISPLAYING INFORMATION FOR VEHICLE

CROSS REFERENCE

This application is based on and claims priority under 35 USC 119 from Korean Patent Application No. 10-2010-0079601, filed on Aug. 18, 2010.

BACKGROUND

1. Field of the Invention

The present invention relates to vehicle information display device and method for a vehicle.

2. Description of the Related Art

In general, an information display device performing a car audio function, a route guiding function, and the like is mounted on a vehicle so as to comfort a driver's tedium or to help a driver drive the vehicle. The information display device further has a broadcast service function such as terrestrial DMB and a multimedia function such as video reproduction.

Recently, the information display device further has had a function of displaying an image supplied from a rear camera on a display unit when the vehicle backward moves in cooperation with the rear camera.

Such an information display device includes single processing means (for example, a processor).

However, since the information display device including the single processing means performs various complex functions, the booting time of the information display device increases to be equal to or greater than about 7 seconds. Accordingly, there is a problem in that the information display function can be performed normally after the booting is ended.

In consideration that a driver generally puts the transmission into reverse to backward drive the vehicle just after starting up the vehicle, such a problem may cause inconvenience that the driver waits until the booting of the information display device is ended, or may cause a dangerous situation that the driver starts driving the vehicle in a state where safety is not guaranteed for the rear side of the vehicle.

The above-mentioned related art is technical information which is thought out to make the invention or is learned by the inventor in the course of making the invention, but cannot be thus said to be technical information known to the public before filing the invention.

SUMMARY

An advantage of some aspects of the invention is that it provides information display device and method for a vehicle in which a sub processing unit processes an image input from a rear camera and displays the processed image on a display unit until a main processing unit ends a booting operation, when a vehicle enters a back-up mode in a state where the main processing unit is performing the booting operation.

Another advantage of some aspects of the invention is that it provides information display device and method for a vehicle which can guarantee safety at the time of backing a vehicle up even when a main processing unit is performing a booting operation and which can make a driver not wait until the main processing unit ends the booting operation for the purpose of acquiring necessary information.

Other advantages of the invention will be apparently understood from the following description.

According to an aspect of the invention, there is provided a information display device for a vehicle including: a camera unit that generates and outputs image information on the rear side of the vehicle; a main processing unit that performs predetermined functions including an image processing function on the image information; and a sub processing unit that processes the image information and displays the processed image information on a display unit until the main processing unit ends a booting operation, when the image information is output from the camera unit in a state where the main processing unit is performing the booting operation.

The main processing unit may activate firmware or an ROTS (Real-time Operation System) so as to allow the sub processing unit to process the image information and then loads OS (Operating System) data read from a storage medium into a memory so as to perform the booting operation, when a boot loader is activated.

The sub processing unit may include a sensor that receives a gear shift event for allowing a vehicle to enter a back-up mode, and may check whether the main processing unit ends the booting operation when the gear shift event is received.

The sensor may be one of a GPIO (General Purpose Input/Output) pin and an external interrupt unit.

The camera unit may be activated when a gear shift event for allowing a vehicle to enter a back-up mode is received.

The sub processing unit may determine whether the main processing unit is performing the booting operation on the basis of information stored in a storage space to be shared with the main processing unit.

The sub processing unit may determine whether the main processing unit is performing the booting operation on the basis of a signal received from the main processing unit through a signal line connected to the main processing unit.

The main processing unit and the sub processing unit may be embodied as a single chip or individual chips.

The information display device may further include: a first switching unit that sets an input path for inputting the image information output from the camera unit to one of the main processing unit and the sub processing unit; and a second switching unit that sets an output path for inputting display data output from one of the main processing unit and the sub processing unit to the display unit.

The sub processing unit may control the first and second switches to input the image information and to output the display data when the image information is output from the camera unit in the state where the main processing unit is performing the booting operation.

According to another aspect of the invention, there is provided an information display method carried out by a sub processing unit of an information display device, including the steps of receiving a gear shift event for allowing a vehicle to enter a back-up mode; determining whether a main processing unit is performing a booting operation; and processing image information output from a camera unit and outputting the processed image information to a display unit until the main processing unit ends the booting operation when it is determined that the main processing unit is performing the booting operation.

The main processing unit may activate firmware or an ROTS (Real-time Operation System) so as to allow the sub processing unit to process the image information and then loads OS (Operating System) data read from a storage medium into a memory so as to perform the booting operation, when a boot loader is activated.

The sub processing unit may include a sensor that receives a gear shift event, and may check whether the main processing unit ends the booting operation when the gear shift event is received.

The sensor may be one of a GPIO (General Purpose Input/Output) pin and an external interrupt unit.

The camera unit may generate and output image information on the rear side of a vehicle, and may be activated when a gear shift event for allowing the vehicle to enter a back-up mode is received.

The sub processing unit may determine whether the main processing unit is performing the booting operation on the basis of information stored in a storage space to be shared with the main processing unit.

The sub processing unit may determine whether the main processing unit is performing the booting operation on the basis of a signal received from the main processing unit through a signal line connected to the main processing unit.

The information display device may further include: a first switching unit that sets an input path for inputting the image information output from the camera unit to one of the main processing unit and the sub processing unit; and a second switching unit that sets an output path for inputting display data output from one of the main processing unit and the sub processing unit to the display unit. Here, the sub processing unit may control the first and second switches to input the image information and to output the display data when the image information is output from the camera unit in the state where the main processing unit is performing the booting operation.

According to the above-mentioned configurations, it is possible to allow a sub processing unit to process an image input from a rear camera and to display the processed image on a display unit until a main processing unit ends a booting operation, when a vehicle enters a back-up mode in a state where the main processing unit is performing the booting operation.

It is also possible to guarantee safety at the time of backing a vehicle up even when a main processing unit is performing a booting operation and a driver does not have to wait until the main processing unit ends the booting operation for the purpose of acquiring necessary information.

DESCRIPTION OF EXEMPLARY EMBODIMENTS

Figure 1:
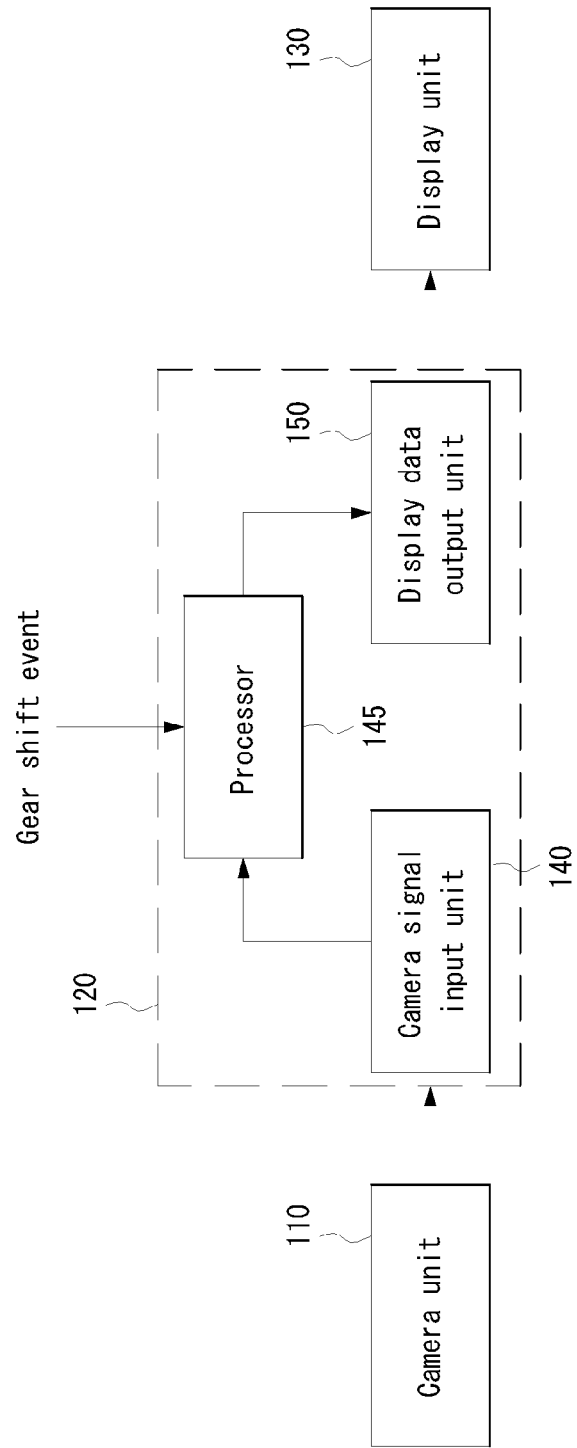
FIG. 1 is a diagram schematically illustrating the configuration of an information display device according to the related art.

The invention can be variously modified in various forms and specific embodiments will be described and shown in the drawings. However, the embodiments are not intended to limit the invention, but it should be understood that the invention includes all the modifications, equivalents, and replacements belonging to the spirit and the technical scope of the invention. When it is determined that detailed description of known techniques associated with the invention makes the gist of the invention obscure, the detailed description will be omitted.

Terms such as "first" and "second" can be used to describe various elements, but the elements are not limited to the terms. The terms are used only to distinguish one element from another element.

The terms used in the following description are used to merely describe specific embodiments, but are not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Terms, "unit", "-er(-or)", "module", and the like, described in the specification mean a unit for performing at least one function or operation and can be embodied by hardware, by software, or by a combination of hardware and software.

So long as they are not defined differently, all the terms used herein, which include technical or scientific terms, have the same meanings as generally understood by those skilled in the art. The terms defined in dictionaries used in general should be analyzed to have the same meaning as in the contexts of the related art, but the terms should not be analyzed ideal or excessively formal as long as they are not clearly defined.

The exemplary embodiments of the invention will be described below in detail with reference to the accompanying drawings.

FIG. 1 is a diagram schematically illustrating the configuration of an information display device according to the related art.

Referring to FIG. 1, the information display device includes a camera unit 110, an image processing unit 120, and a display unit 130. Although not shown, the information display device may further include a memory unit that stores image data processed by the image processing unit 120.

The camera unit 110 is mounted on a vehicle so as to monitor the rear side of the vehicle and generates and outputs an image of the rear side of the vehicle. The camera unit 110 can be embodied by a camera device including a lens and an image processor and is turned on when a gear shift for allowing a vehicle to enter a back-up mode is sensed. The camera unit 110 may further include an A/D converter that converts analog image information into digital image information.

The image processing unit 120 includes a camera signal input unit 140, a processor 145, and a display data output unit 150.

The camera signal input unit 140 provides the processor 145 with image information input from the camera unit 110.

The processor 145 senses an external interrupt associated with the gear shift. When the external interrupt is associated with the gear shift for allowing the vehicle to enter the back-up mode, the processor 145 processes the image information input from the camera unit 110, converts the processed image information into display data to be displayed on the display unit 130, and outputs the display data to the display data output unit 150.

The processor 145 may sense the external interrupt through a GPIO (General Purpose Input/Output) or may include an external interrupt unit for sensing the external interrupt. The configuration of the processor 145 for sensing the external interrupt is obvious to those skilled in the art and thus description thereof is not made.

The processor 145 performs an image process (for example, one or more of lens shading compensation, noise filtering, global contrast enhancement, auto white balance, encoding, and decoding) on the image information input from the camera unit 110.

The processor 145 may be embodied as a chip including an image signal processor and/or a multimedia processor.

The display data output unit 150 provides the display data output from the processor 145 to the display unit 130 so as to display the display data on a display screen.

As described above, the image processing unit 120 can allow a driver to recognize the rear situation of the vehicle by repeatedly performing the procedure of processing the image information input from the camera unit 110 and updating a screen image to be displayed on the display unit 130.

In this way, the information display device according to the related art includes only the single processor 145. The booting time of the information display device has increased to perform various complex functions and the rear monitoring function desired by the driver is not normally performed in the course of booting.

Figure 2:
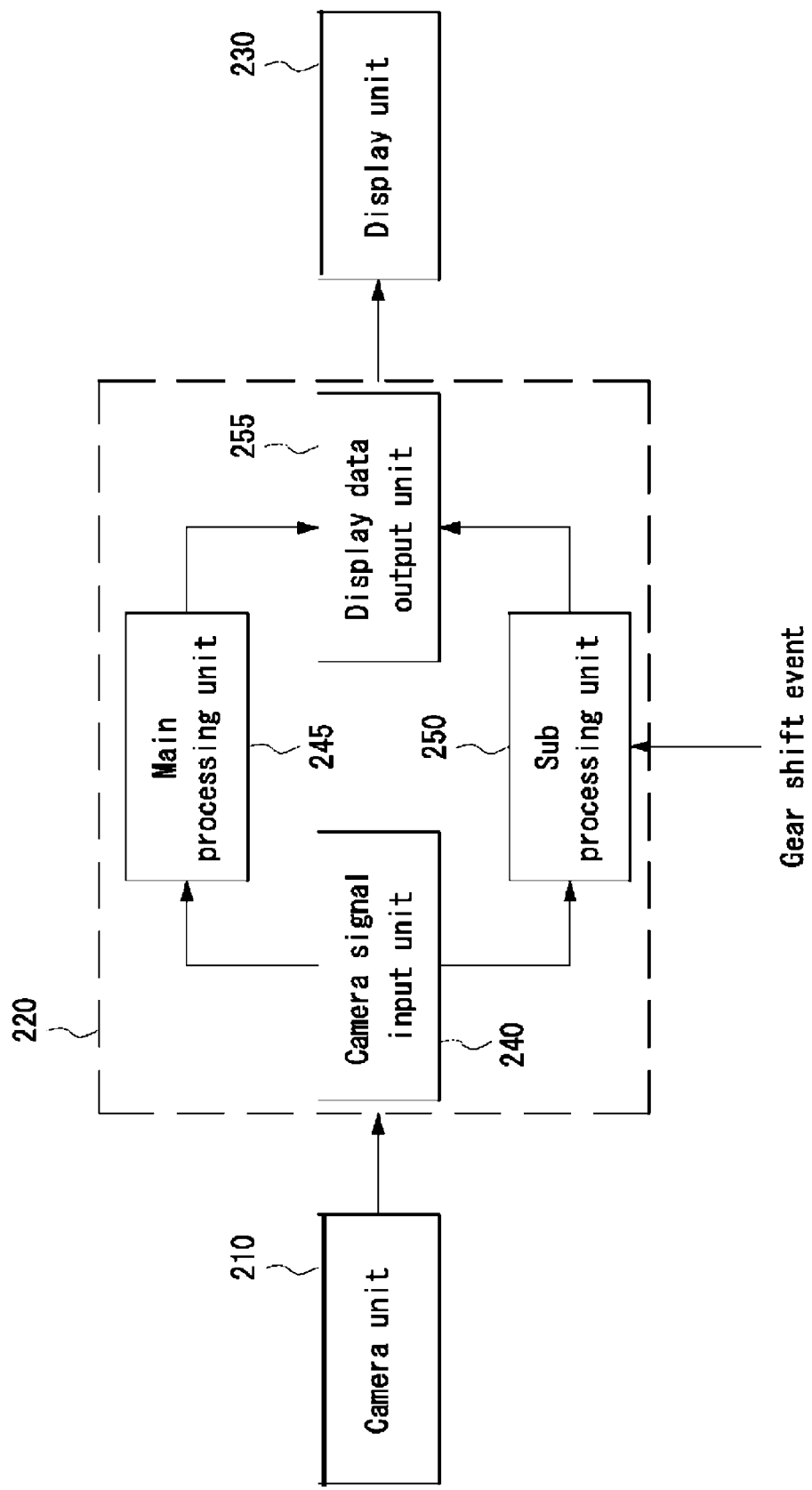
FIG. 2 is a diagram schematically illustrating the configuration of an information display device according to an embodiment of the invention.

FIG. 2 is a diagram schematically illustrating the configuration of an information display device according to an embodiment of the invention.

Referring to FIG. 2, the information display device includes a camera unit 210, an image processing unit 220, and a display unit 230. Although not shown, the information display device may further include a memory unit that stores image data processed by the image processing unit 220.

The camera unit 210 is mounted on a vehicle so as to monitor the rear side of the vehicle and generates and outputs image information on the rear side of the vehicle. The camera unit 210 can be embodied by a camera device including a lens and an image processor. The camera unit 210 may further include an A/D converter that converts analog image information into digital image information.

The image processing unit 220 includes a camera signal input unit 240, a main processing unit 245, a sub processing unit 250, and a display data output unit 255.

The camera signal input unit 240 provides the main processing unit 245 or the sub processing unit 250 with the image information input from the camera unit 210. That is, in a back-up mode, the image information is supplied to the main processing unit 245 when the main processing unit ends a booting operation, and the image information is supplied to the sub processing unit 250 when the main processing unit 245 is performing the booting operation.

The main processing unit 245 is a processing unit that performs a function designated to be performed by the image processing unit 220 in a state where the booting of the information display device is normally ended. The sub processing unit 250 is a processing unit that performs a process (for example, one or more of lens shading compensation, noise filtering, global contrast enhancement, auto white balance, encoding, and decoding) on the image information input from the camera unit 210 and displays the processed image information on the display unit 230.

The main processing unit 245 and the sub processing unit 250 may each include an image signal processor and/or a multimedia processor, and may be embodied as individual chips or as a single chip. When the main processing unit 245 and the sub processing unit 250 are embodied as individual chips, a camera signal input unit and a display data output unit may be included in each chip.

When the information display device is turned on, the main processing unit 245 starts performing the booting operation. In the booting operation of the main processing unit 245, a boot loader is first activated, firmware or an ROTS (Real-time Operation System) is activated to allow the sub processing unit 250 to process the image information, OS (Operating System) data is read from a storage medium and is loaded into a memory, and then the actual booting operation is started. By this booting operation, the sub processing unit 250 can be switched to a state where the image information input from the camera unit 210 can be processed even when the main processing unit 245 is performing the booting operation.

The sub processing unit 250 includes an external interrupt unit that senses an external interrupt. Since the external interrupt unit is disposed in the sub processing unit 250, the sub processing unit 250 can sense the external interrupt and perform necessary processes without interruption or help of the main processing unit 245. The external interrupt may be sensed by the GPIO as described above. When the external interrupt associated with a gear shift for allowing the vehicle to enter the back-up mode is sensed, the sub processing unit 250 checks the state of the main processing unit 245, and starts processing and outputting the image information input from the camera unit 210 when the main processing unit 245 is performing the booting operation.

When the main processing unit 245 and the sub processing unit 250 are embodied as a single chip, a storage space (not shown) used for the main processing unit 245 and the sub processing unit 250 to share information is disposed in the chip. One or more of information on a current state, information on processes, and setting and control information on other elements (for example, one or more of the camera signal input unit, the display data output unit, and the first and second switching units) is stored in the storage space.

The sub processing unit 250 recognizes the current state of the main processing unit 245 with reference to the storage space. The main processing unit 245 checks the processing state on the basis of the information stored in the shared storage space so as to perform the process, which is performed by the sub processing unit 250, and control the other elements so as to input and output the image information, after the booting operation is ended.

However, when the main processing unit 245 and the sub processing unit 250 are embodied as individual chips and the shared storage space is not present, the main processing unit 245 notifies the sub processing unit of the end of the booting operation by the GPIO, receives and processes the image information by controlling the other elements (such as the first and second switching units), and outputs the processed information to the display unit 230.

As described above, the image processing unit 220 according to this embodiment includes the main processing unit 245 and the sub processing unit 250 and can normally perform the rear side monitoring function by the use of the sub processing unit 250 switched to a state where it can normally perform processes even before the main processing unit 245 ends the booting operation.

Figure 3:
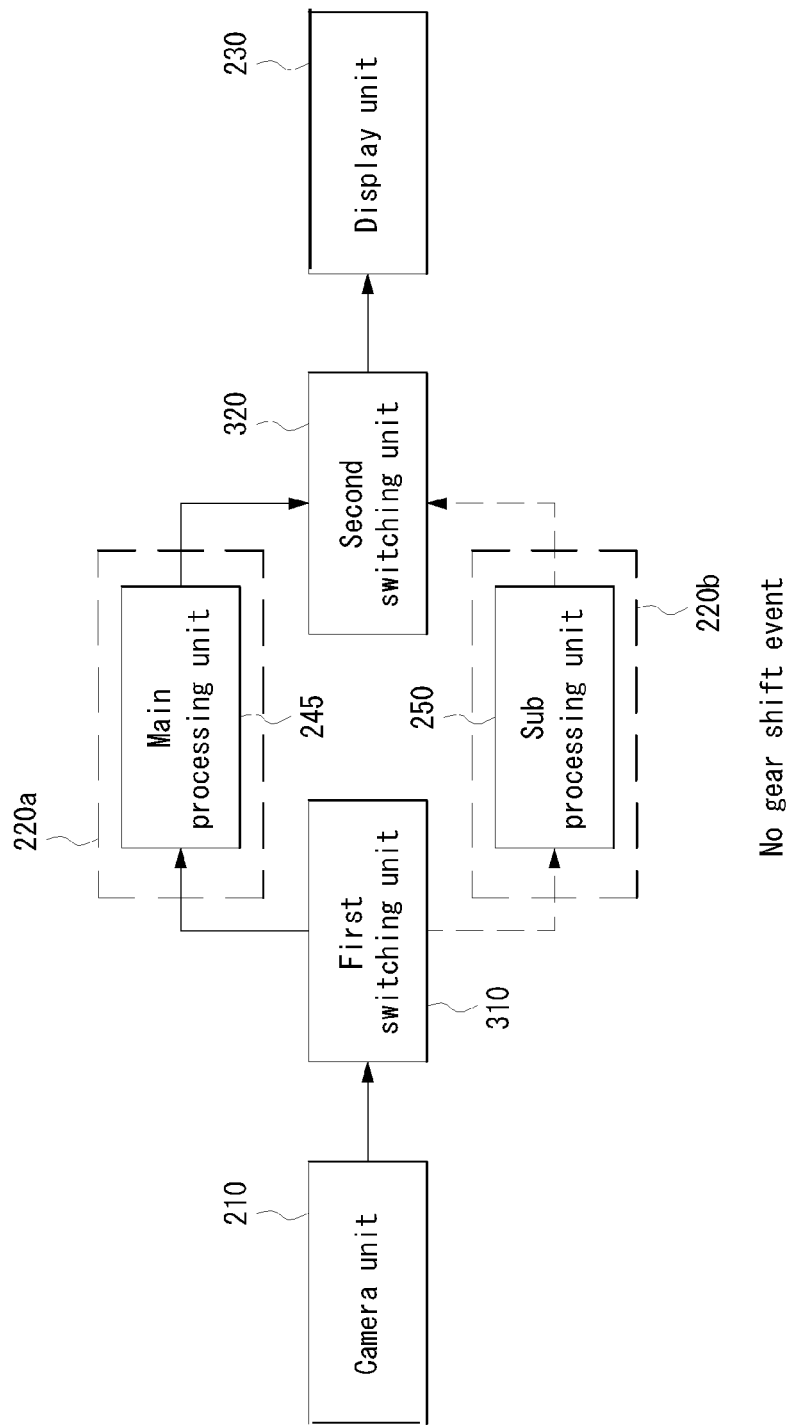
FIGS. 3 and 4 are diagrams schematically illustrating the flow of operations in an information display device according to an embodiment of the invention.
Figure 4:
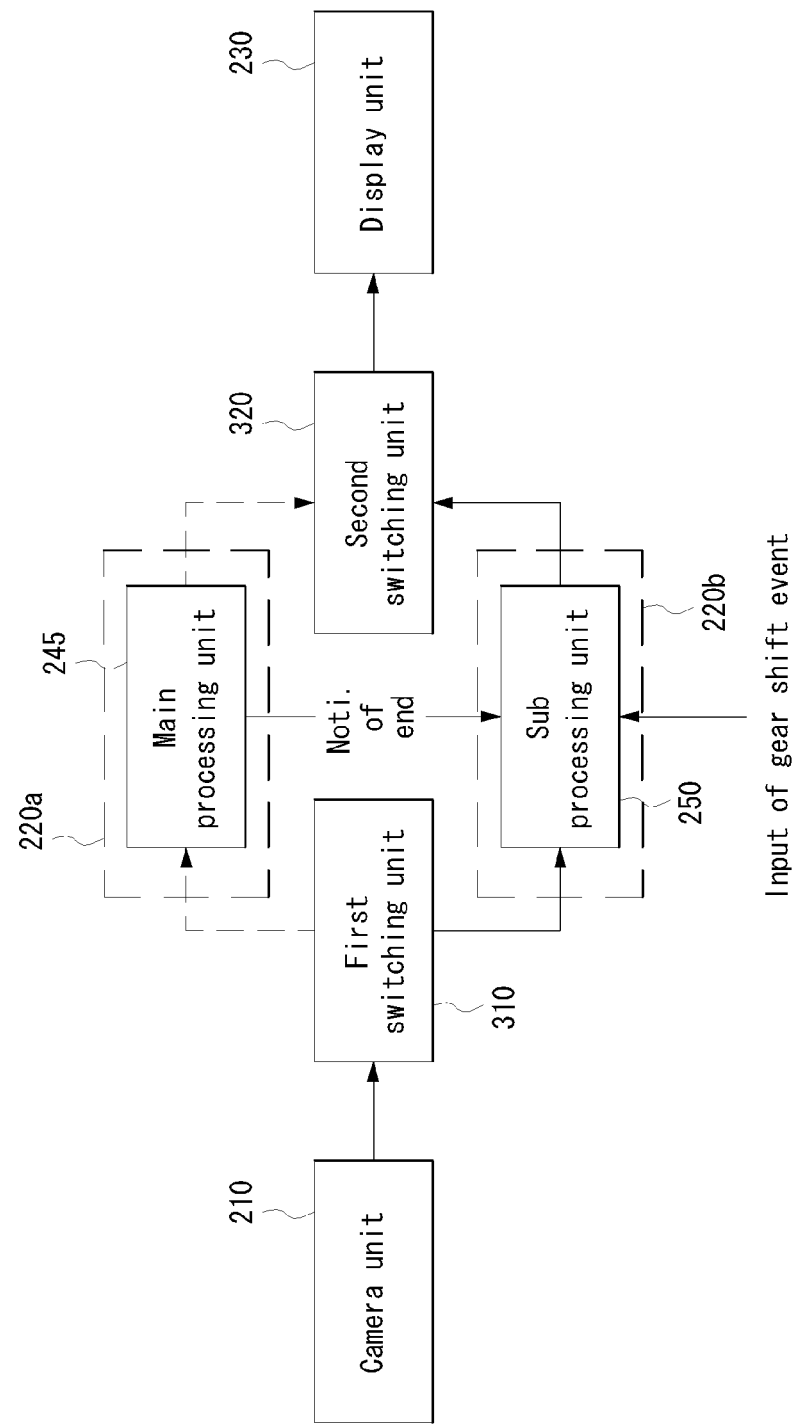

FIGS. 3 and 4 are diagrams schematically illustrating the flow of operations in an information display device according to an embodiment of the invention. FIGS. 3 and 4, the main processing unit 245 and the sub processing unit 250 are embodied as individual chips, respectively.

Referring to FIGS. 3 and 4, the information display device includes a camera unit 210, a first image processing unit 220a second image processing unit 220b, a display unit 230, a first switching unit 310, and a second switching unit 320. Although not shown, the information display device may further include a memory unit for storing image data processed by the image processing units 220a and 220b.

The first switching unit 310 inputs image information input from the camera unit 210 to the first image processing unit 220a and the second image processing unit 220b.

For example, the first switching unit 310 may set a default path (see FIG. 3) so as to input the image information to the first image processing unit 220; may switch an input path of the image information to the second image processing unit 220b (see FIG. 4) under the control of the sub processing unit 250 having received an external interrupt on the gear shift for allowing the vehicle to enter the back-up mode during the booting operation of the main processing unit 245, or may switch the input path of the image information to the first image processing unit 220a again under the control of the main processing unit 245 having ended the booting operation. The path control of the main processing unit 245 and the sub processing unit 250 may be carried out, for example, using the GPIO.

The first image processing unit 220a and the second image processing unit 220b may include the main processing unit 245 and the sub processing unit 250, respectively, as shown in the drawing. The first and second image processing units 220a and 220b may further include the camera signal input unit 240 and the display data output unit 250 described above.

The main processing unit 245 and the sub processing unit 250 can be connected to each other through the GPIO or an interrupt line. The main processing unit 245 outputs a high signal or a low signal to the sub processing unit 250 through the GPIO depending on whether it is performing the booting operation. The sub processing unit 250 senses the current state of the main processing unit 245 on the basis of the signal.

Accordingly, the sub processing unit 250 processes and outputs the image information input from the camera unit 210 only when the main processing unit 245 is performing the booting operation in the back-up mode of the vehicle, and controls the first and second switching units 310 and 320 to allow the main processing unit 245 to process and output the image information when the main processing unit 245 ends the booting operation.

In this case, the main processing unit 245 and the sub processing unit 250 output display data which is obtained by processing the image information input through the switching of the first switching unit 310.

In addition, the main processing unit 245 having ended the booting operation may access a storage space, which stores processing information, in the sub processing unit 250 and sharing the processing information using a host port interface (HPI) method. In this way, when the HPI method is used, the booting state information of the main processing unit 245 may be supplied to the sub processing unit 250 through the HPI.

The main processing unit 245 or the sub processing unit 250 controls the second switching unit 320 to output the display data obtained by processing the image information to the display unit 230 for the purpose of the rear monitoring function.

Figure 5:
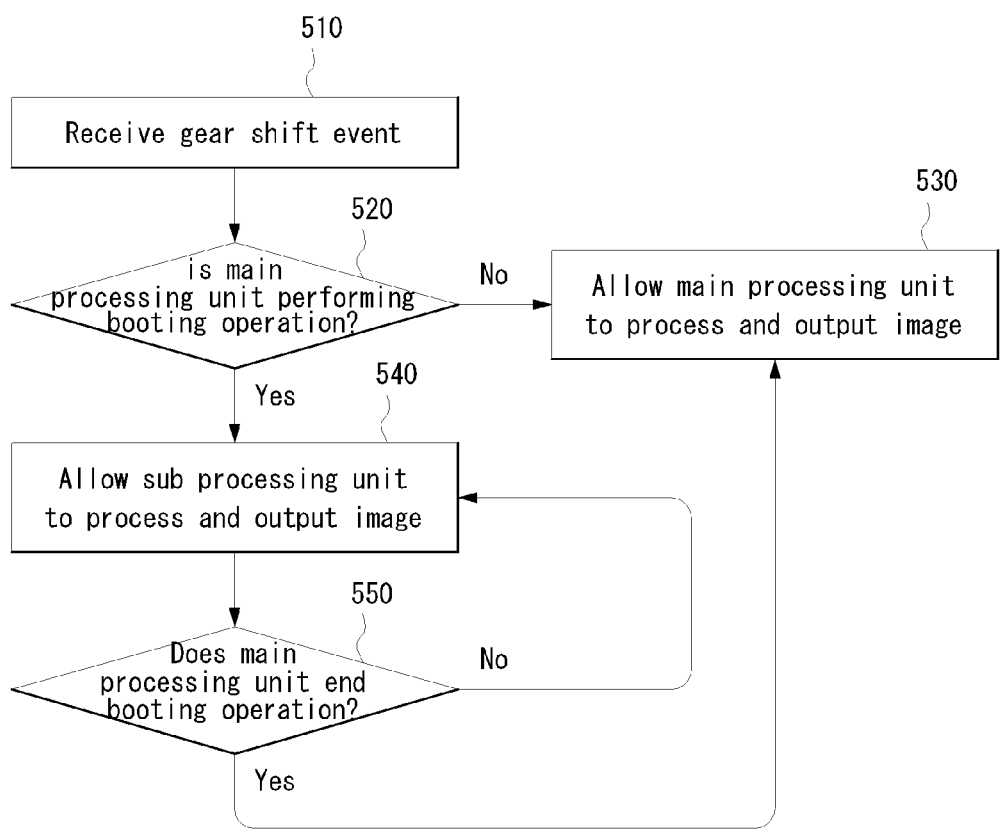
FIG. 5 is a flowchart illustrating the flow of processes of an information display device according to an embodiment of the invention.

FIG. 5 is a flowchart illustrating the flow of an information display method according to an embodiment of the invention.

Referring to FIG. 5, the sub processing unit 250 receives a gear shift event for allowing a vehicle to enter a back-up mode through the GPIO or the external interrupt unit in step 510.

In step 520, the sub processing unit 250 determines whether the main processing unit 245 is performing the booting operation, on the basis of the information stored in the storage space shared with the main processing unit 245 or on the basis of the signal supplied from the main processing unit 245 through the GPIO or using the HPI method.

When the main processing unit 245 ends the booting operation, the main processing unit 245 processes the image information input from the camera unit 210 and outputs the processed image information to the display unit 230 in step 530.

On the contrary, when the main processing unit 245 is performing the booting operation, the sub processing unit 250 processes the image information input from the camera unit 210 and outputs the processed image information to the display unit in step 540. At this time, the switching operation is carried out so that the input path of the image information from the camera unit 210 and the output path to the display unit 230 pass through the sub processing unit 250.

When the vehicle is in the back-up mode (that is, when the image information is continuously being input from the camera unit 210), the sub processing unit 250 determines whether the main processing unit 245 ends the booting operation in step 550.

When it is determined that the main processing unit 245 does not end the booting operation, the sub processing unit 250 processes and outputs the image information input from the camera unit 210 again in step 540.

On the contrary, when it is determined that the main processing unit 245 ends the booting operation, the main processing unit 245 processes and outputs the image information input from the camera unit 210 in step 530. At this time, the switching operation is carried out so that the input path of the image information from the camera unit 210 and the output path to the display unit 230 pass through the main processing unit 245.

The above-mentioned vehicle information display method may be put into practice in the form of a time-series automated procedure by a software program built in the vehicle information display device. Codes and code segments of the program will be easily obtained by programmers skilled in the art. The program can be stored in a computer-readable recording medium and can be read and executed by a computer to embody the above-mentioned method. Examples of the recording medium include a magnetic recording medium, an optical recording medium, and a carrier wave medium.

While the invention has been described with reference to the exemplary embodiments, it will be understood by those skilled in the art that the invention can be modified and changed in various forms without departing from the spirit and scope of the invention described in the appended claims.

What is claimed is:

1. An information display device for a vehicle comprising:
   a camera unit that generates and outputs image information on the rear side of the vehicle;
   a main processing unit that performs predetermined functions including an image processing function on the image information; and
   a sub processing unit that
      receives a gear shift event for allowing the vehicle to enter a back-up mode,
      determines whether the main processing unit is performing a booting operation, and
      processes the image information output from the camera unit and outputs the processed image information to a display unit until the main processing unit ends the booting operation when it is determined that the main processing unit is performing the booting operation, based on the received gear shift event.

2. The information display device according to claim 1, wherein the main processing unit activates firmware or an ROTS (Real-time Operation System) so as to allow the sub processing unit to process the image information and then loads OS (Operating System) data read from a storage medium into a memory so as to perform the booting operation, when a boot loader is activated.

3. The information display device according to claim 1, wherein the sub processing unit includes a sensor that receives the gear shift event, and checks whether the main processing unit ends the booting operation.

4. The information display device according to claim 3, wherein the sensor is one of a GPIO (General Purpose Input/Output) pin and an external interrupt unit.

5. The information display device according to claim 1, wherein the camera unit is activated when the gear shift event is received.

6. The information display device according to claim 1, wherein the sub processing unit determines whether the main processing unit is performing the booting operation on the basis of information stored in a storage space to be shared with the main processing unit.

7. The information display device according to claim 1, wherein the sub processing unit determines whether the main processing unit is performing the booting operation on the basis of a signal received from the main processing unit through a signal line connected to the main processing unit.

8. The information display device according to claim 1, wherein the main processing unit and the sub processing unit are embodied as a single chip or individual chips.

9. The information display device according to claim 1, further comprising:
   a first switching unit that sets an input path for inputting the image information output from the camera unit to one of the main processing unit and the sub processing unit; and
   a second switching unit that sets an output path for inputting display data output from one of the main processing unit and the sub processing unit to the display unit.

10. The information display device according to claim 9, wherein the sub processing unit controls the first and second switches to input the image information and to output the display data when the image information is output from the camera unit in the state where the main processing unit is performing the booting operation.

11. An information display method carried out by a sub processing unit of an information display device, comprising:
   receiving a gear shift event for allowing a vehicle to enter a back-up mode;
   determining whether a main processing unit is performing a booting operation; and
   processing image information output from a camera unit and outputting the processed image information to a display unit until the main processing unit ends the booting operation when it is determined that the main processing unit is performing the booting operation, based on the received gear shift event.

12. The information display method according to claim 11, wherein the main processing unit activates firmware or an ROTS (Real-time Operation System) so as to allow the sub processing unit to process the image information and then loads OS (Operating System) data read from a storage medium into a memory so as to perform the booting operation, when a boot loader is activated.

13. The information display method according to claim 11, wherein the sub processing unit includes a sensor that receives the gear shift event, and checks whether the main processing unit ends the booting operation.

14. The information display method according to claim 13, wherein the sensor is one of a GPIO (General Purpose Input/Output) pin and an external interrupt unit.

15. The information display method according to claim 11, wherein the camera unit generates and outputs image information on the rear side of a vehicle, and is activated when the gear shift event is received.

16. The information display method according to claim 11, wherein the sub processing unit determines whether the main processing unit is performing the booting operation on the basis of information stored in a storage space to be shared with the main processing unit.

17. The information display method according to claim 11, wherein the sub processing unit determines whether the main processing unit is performing the booting operation on the basis of a signal received from the main processing unit through a signal line connected to the main processing unit.

18. The information display method according to claim 11, wherein the information display device further includes:
   a first switching unit that sets an input path for inputting the image information output from the camera unit to one of the main processing unit and the sub processing unit; and
   a second switching unit that sets an output path for inputting display data output from one of the main processing unit and the sub processing unit to the display unit, and
   wherein the sub processing unit controls the first and second switches to input the image information and to output the display data when the image information is output from the camera unit in the state where the main processing unit is performing the booting operation.

19. A non-transitory recording medium having recorded thereon a program for reading by a sub processing unit and in which command words are executable by the sub processing unit to carry out the information display method according to claim 11.

* * * * *